US009167177B2

(12) United States Patent
Jacobs et al.

(10) Patent No.: US 9,167,177 B2
(45) Date of Patent: Oct. 20, 2015

(54) SYSTEMS AND METHODS FOR CREATING AN ETERNALISM, AN APPEARANCE OF SUSTAINED THREE DIMENSIONAL MOTION-DIRECTION OF UNLIMITED DURATION, USING A FINITE NUMBER OF IMAGES

(71) Applicants: Kenneth Martin Jacobs, New York, NY (US); Ronald Steven Karpf, Corvallis, OR (US)

(72) Inventors: Kenneth Martin Jacobs, New York, NY (US); Ronald Steven Karpf, Corvallis, OR (US)

( * ) Notice: Subject to any disclaimer, the term of this patent is extended or adjusted under 35 U.S.C. 154(b) by 0 days.

(21) Appl. No.: 14/268,423

(22) Filed: May 2, 2014

(65) Prior Publication Data

US 2014/0300816 A1    Oct. 9, 2014

Related U.S. Application Data

(60) Continuation of application No. 13/168,493, filed on Jun. 24, 2011, now Pat. No. 8,750,382, which is a continuation-in-part of application No. 12/555,482, filed on Sep. 8, 2009, now Pat. No. 7,976,159, and a continuation-in-part of application No. 12/938,495, filed on Nov. 3, 2010, now abandoned, which is a (Continued)

(51) Int. Cl.
*H04N 7/12*         (2006.01)
*G06K 9/36*         (2006.01)
*H04N 5/262*        (2006.01)
*G02B 27/01*        (2006.01)
*G02B 27/22*        (2006.01)
*G02C 7/10*         (2006.01)
*H04N 13/00*        (2006.01)
*H04N 13/04*        (2006.01)
*H04N 13/02*        (2006.01)

(52) U.S. Cl.
CPC ............ *H04N 5/2627* (2013.01); *G02B 27/017* (2013.01); *G02B 27/2221* (2013.01); *G02C 7/101* (2013.01); *H04N 13/0033* (2013.01); *H04N 13/04* (2013.01); *H04N 13/0438* (2013.01); *H04N 13/0454* (2013.01); *H04N 13/0456* (2013.01); *H04N 13/0497* (2013.01); *G02B 2027/014* (2013.01); *G02B 2027/0134* (2013.01); *H04N 13/026* (2013.01); *H04N 13/0431* (2013.01); *H04N 13/0434* (2013.01); *H04N 2213/002* (2013.01); *H04N 2213/006* (2013.01); *H04N 2213/008* (2013.01)

(58) Field of Classification Search
USPC ................. 348/42, 385.1, 579; 382/284, 294; 375/240.16
See application file for complete search history.

(56) References Cited

U.S. PATENT DOCUMENTS

| 3,991,266 | A | * | 11/1976 | Baer | 348/385.1 |
| 5,649,032 | A | * | 7/1997 | Burt et al. | 382/284 |
| 6,078,701 | A | * | 6/2000 | Hsu et al. | 382/294 |
| 7,030,902 | B2 | * | 4/2006 | Jacobs | 348/42 |

*Primary Examiner* — Gims Philippe
(74) *Attorney, Agent, or Firm* — Lucas & Mercanti, LLP; Donald C. Lucas

(57) ABSTRACT

Data comprising a compressed image frame and temporal redundancy information is received. The image frame is decompressed. A plurality of bridge frames that are visually dissimilar to the image frame are generated. The image frame and the plurality of bridge frames are blended, generating a plurality of blended frames, and the plurality of blended frames are displayed.

15 Claims, 19 Drawing Sheets

Related U.S. Application Data division of application No. 12/555,545, filed on Sep. 8, 2009, now Pat. No. 7,850,304, which is a continuation-in-part of application No. 12/274,752, filed on Nov. 20, 2008, now Pat. No. 7,604,348, said application No. 12/555,482 is a division of application No. 12/274,752, filed on Nov. 20, 2008, now Pat. No. 7,604,348, which is a continuation-in-part of application No. 11/928,152, filed on Oct. 30, 2007, now Pat. No. 7,508,485, and a continuation-in-part of application No. 11/372,723, filed on Mar. 10, 2006, now Pat. No. 7,522,257, and a continuation of application No. 11/373,702, filed on Mar. 10, 2006, now Pat. No. 7,405,801, said application No. 11/372,723 is a continuation of application No. 11/373,702, and a continuation-in-part of application No. 10/054,607, filed on Jan. 22, 2002, now Pat. No. 7,030,902, said application No. 11/928,152 is a continuation-in-part of application No. 10/054,607.

(60) Provisional application No. 61/398,981, filed on Jul. 2, 2010, provisional application No. 60/664,369, filed on Mar. 23, 2005, provisional application No. 60/661,847, filed on Mar. 15, 2005, provisional application No. 60/263,498, filed on Jan. 23, 2001.

INDIVIDUAL

SERIES

REPEATING SERIES

INDIVIDUAL

BLEND A/C

BLEND A/B

BLEND B/C

SERIES

BLEND A/C    A    BLEND A/B    B    BLEND B/C    C

REPEATING SERIES

B/C    C    A/C    A    A/B    B    B/C    C    A/C    A

INDIVIDUAL

SERIES

REPEATING SERIES

SERIES

REPEATING SERIES

INDIVIDUAL

SERIES

REPEATING SERIES

INDIVIDUAL

A          B          C

SERIES

A          B          C

REPEATING SERIES

C    A    B    C    A    B    C

INDIVIDUAL

BLEND A/C     BLEND A/B     BLEND B/C
(Superimpose)

SERIES

A/C    A    A/B    B    B/C    C

REPEATING SERIES

B/C    C    A/C    A    A/B    B    B/C    C    A/C    A

INDIVIDUAL

D  Fig. 8a  E

SERIES

D  E  C

REPEATING SERIES

C  D  E  C  D  E  C

SERIES

REPEATING SERIES

INDIVIDUAL

G        Fig. 10a        H

SERIES

G        H        C

REPEATING SERIES

C    G    H    C    G    H    C

SYSTEMS AND METHODS FOR CREATING AN ETERNALISM, AN APPEARANCE OF SUSTAINED THREE DIMENSIONAL MOTION-DIRECTION OF UNLIMITED DURATION, USING A FINITE NUMBER OF IMAGES

CROSS REFERENCE OF RELATER APPLICATIONS

This application is a Continuation of U.S. patent application Ser. No. 13/168,493, filed on Jun. 24, 2011, which claims priority from U.S. Provisional application No. 61/398,981, filed on Jul. 2, 2010, and is in turn a Continuation-In-Part (CIP) of U.S. patent application Ser. No. 12/938,495, filed Nov. 3, 2010, which is a divisional of U.S. patent application Ser. No. 12/555,545, now U.S. Pat. No. 7,850,304, filed Sep. 8, 2009, and U.S. patent application Ser. No. 12/555,482, filed Sep. 8, 2009, which is a divisional application of U.S. patent application Ser. No. 12/274,752, now U.S. Pat. No. 7,604,348, filed Nov. 20, 2008, which in turn is a CIP application of U.S. patent application Ser. No. 11/928,152, now U.S. Pat. No. 7,508,485, filed on Oct. 30, 2007 and U.S. patent application Ser. No. 11/372,723 filed on Mar. 10, 2006, which claims priority of U.S. Provisional Application No. 60/664,369 filed on Mar. 23, 2005 and is a continuation-in-part application of the U.S. application Ser. No. 10/054,607, now U.S. Pat. No. 7,030,902, filed on Jan. 22, 2002, which in turn claims priority of U.S. Provisional Application No. 60/263,498 filed on Jan. 23, 2001. The based applications, U.S. patent application Ser. No. 11/928,152 and U.S. patent application Ser. No. 11/372,723, also claim priority of U.S. patent application Ser. No. 11/373,702 filed on Mar. 10, 2006, which claims priority of U.S. Provisional Application No. 60/661,847 filed on Mar. 15, 2005. The entire contents of each of the above applications are being herein incorporated by reference for all purposes.

TECHNICAL FIELD

This invention relates to visual art and, more particularly, to a method for producing an appearance of continuous movement using a finite number of pictures, i.e., as few as two pictures.

BACKGROUND

Movies are generally made from a series of single, non-repetitive pictures which are viewed at a speed that provides the viewer with the appearance of continuous movement. These series of single pictures are positioned in adjacent picture frames, in sequential order, wherein adjacent pictures are substantially similar to each other and vary only slightly from each other. Usually, movies are created using movie cameras, which capture the actual movement of the object; with animated movies, a series of individual pictures or cells are created, usually by hand or computer, and assembled in sequential order where adjacent pictures of a scene are substantially similar to each other and vary only slightly. Standard film projection is 24 frames per second, American video standard NTSC is 30 f.p.s.

The appearance of continuous movement, using only two substantially similar pictures, has been accomplished in live performance by simultaneous projection of both images onto a screen, wherein one picture may be slightly off-set from the other picture as they appear on the screen, and by rotating a two-bladed propeller, wherein the propeller blades are set off from one another by 180 degrees, in front of and between the two projectors such that the two images are made to both alternate and overlap in their appearances, with both images in turn alternating with an interval of complete darkness onscreen when both projections are blocked by the spinning propeller. A viewer, using no special spectacles or visual aids, perceives a scene of limited action (with a degree of illusionary depth) that can be sustained indefinitely in any chosen direction: an evolving yet limited action appears to be happening continually without visible return-and-start-over repetition. Thus the viewer sees a visual illusion of an event impossible in actual life. Similarly, the manner in which things appear in depth are likely to be at odds, often extremely so, with the spatial character of the original photographed scene. Further, the character of movement and of depth has been made malleable in the hands of the projectionist during performance (so much so that such film-performance has been likened to a form of puppetry); the physical shifting of one of the two projections changes the visual relationship between them and thereby the character of the screen event produced. Similarly, small changes during performance in speed, placement and direction of propeller spin will cause radical changes in the visual event produced onscreen.

Other visual arts which relate to the present invention are the Pulfrich filter. For one program, titled "Bitemporal Vision: The Sea", viewers were invited to place a Pulfrich light reducing filter before one eye to both enhance and transform the already apparent depth character of the presentation.

Limited to presentation in live performance, such unique visual phenomena as described has been transient theater. Attempts to capture the phenomena by way of video-camera recording of the screen-image have been disappointingly compromised, so that—in over 25 years of such presentation (of so-called "Nervous System Film Performances") no attempt has been made to commercialize such recordings.

SUMMARY

In accordance with an embodiment, a method of displaying one or more frames of a video is provided. Data comprising a compressed image frame and temporal redundancy information is received. The image frame is decompressed. A plurality of bridge frames that are visually dissimilar to the image frame are generated. The image frame and the plurality of bridge frames are blended, generating a plurality of blended frames, and the plurality of blended frames are displayed.

In one embodiment, the image frame is decompressed based on the temporal redundancy information.

In another embodiment, the data comprises a compressed video file associated with a compression format that uses temporal redundancy to achieve compression of video data. For example, the data may comprise an MPEG compressed video file.

In another embodiment, each bridge frame comprises a solid black picture, a solid colored picture, or a timed unlit-screen pause.

In another embodiment, the plurality blended frames are displayed in accordance with a predetermined pattern.

In another embodiment, the plurality of blended frames are displayed in accordance with a predetermined pattern that includes a first pattern comprising the plurality of blended frames, and a second pattern that comprises repetition of the first pattern.

These and other advantages of the present disclosure will be apparent to those of ordinary skill in the art by reference to the following Detailed Description and the accompanying drawings.

DETAILED DESCRIPTION

Figure 1A:
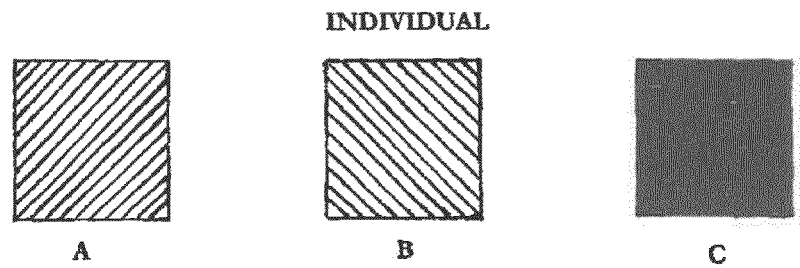
FIGS. 1 *a*-1 *c* illustrates the present invention with three pictures.

In accordance with certain embodiments, a method is provided for originating visual illusions of figures and spaces in continuous movement in any chosen direction using a finite number of pictures (as few as two pictures) that can be permanently stored and copied and displayed on motion picture film or electronic media. The method of the present invention entails repetitive presentation to the viewer of at least two substantially similar image pictures alternating with a third visual interval or bridging picture that is substantially dissimilar to the other substantially similar pictures in order to create the appearance of continuous, seamless and sustained directional movement.

Specifically, two or more image pictures are repetitively presented together with a bridging interval (a bridging picture) which is preferably a solid black or other solid-colored picture, but may also be a strongly contrasting image-picture readily distinguished from the two or more pictures that are substantially similar. In electronic media, the bridge-picture may simply be a timed unlit-screen pause between serial re-appearances of the two or more similar image pictures. The rolling movements of pictorial forms thus created (figures that uncannily stay in place while maintaining directional movement, and do not move into a further phase of movement until replaced by a new set of rotating units) is referred to as Eternalisms, and the process of composing such visual events is referred to as Eternalizing.

The three film or video picture-units are arranged to strike the eyes sequentially. For example, where A and B are the image pictures and C is the bridging picture, the picture units are arranged (A, B, C). This arrangement is then repeated any number of times, as a continuing "loop". The view of this continuing loop allows for the perception of a perceptual combining and sustained movement of image pictures (A, B). Naturally, if this loop is placed on a film strip, then it is arranged and repeated in a linear manner (A, B, C, A, B, C, A, B, C, A, B, C, etc). The repetition of the sequence provides an illusion of continuous movement of the image pictures (A, B); with bridging picture (C), preferably in the form of a neutral or black frame, not consciously noticed by the viewer at all, except perhaps as a subtle flicker.

A more fluid or natural illusion of continuous movement from a finite number of image pictures is provided by using two of each of the three pictures and repeating the cycle of the pairs sequentially, or by blending adjacent pictures together on an additional picture-frame and placing the blended picture between the pictures in sequential order. The two image pictures (A, B) are now blended with each other to produce (A/B); the two image pictures are also blended with the bridging picture to produce (C/A and B/C), and then all pictures repeat in a series starting with the bridging picture (C, C/A, A, A/B, B, B/C) each blended picture being represented by the two letters with a slash therebetween). This series is repeated a plurality of times to sustain the illusion as long as desired. Repeating the sequence with additional blended frames provides more fluid illusion of continuous movement of the (optically combined) two image pictures (A, B).

Additionally, various arrangements of the pictures and the blends can be employed in the present invention and need not be the same each time. By varying the order of pictures in the sequence, the beat or rhythm of the pictures is changed. For example, A, B, C can be followed by A, A/B, B, B, B/C, C which in turn is followed by A, A, A/B, B, B, B, B/C, C, C, C, C, i.e. A, B, C, A, A/B, B, B/C, C, A, A, A/B, B, B, B, B/C, C, C, C, C, A, B, C, A, etc.

With A and B frames being similar images (such as a pair of normal two-eye perspective views of a three-dimensional scene from life), and frame C a contrasting frame (preferably a solid-color picture instead of an image-picture) relative to A,B, frame C acts as essentially a "bridge-interval" placed between recurrences of A,B. Any color can be used for the contrasting frame C: for example, blue, white, green; however, black is usually preferred. The contrasting frame can also be chosen from one of the colors in one of the two image pictures. For example, if one of the image pictures has a large patch of dark blue, then the color of the contrasting frame, bridging picture, may be dark blue.

Blending of the pictures is accomplished in any manner which allows for both pictures to be merged in the same picture frame. Thus, the term "blending" as used in the specification and claims can also be called superimposing, since one picture is merged with the other picture. Blending is done in a conventional manner using conventional equipment, suitably, photographic means, a computer, an optical printer, or a rear screen projection device. For animated art, the blending can be done by hand as in hand drawing or hand painting. Preferably, a computer is used. Suitable software programs include Adobe Photoshop, Media 100 and Adobe After Affects. Good results have been obtained with Media 100 from Multimedia Group Data Translations, Inc. of Marlborough, Mass., USA.

When using Media 100, suitable techniques include additive dissolving, cross-dissolving, and dissolving-fast fix and dither dissolving.

In blending the pictures, it is preferred to use 50% of one and 50% of the other. However, the blending can be done on a sliding scale, for example with three blended pictures, a sliding scale of quarters, i.e. 75% A/25% B, 50% A/50% B, 25% A/75% B. Good results have been obtained with a 50%/50% mix, i.e. a blend of 50% A/50% B.

The two image pictures, A and B, which are visually similar to each other, are preferably taken from side-by-side frame exposures from a motion picture fibre of an object or image or that is moving such that when one is overlaid with the other, only a slight difference is noted between the two images.

Alternatively, the two image pictures are identical except that one is off-center from the other. The direction of the off-center, e.g. up, down, right, or left, will determine which direction the series provides the appearance of movement, e.g. if image picture B is off-center from image picture A to the right of A, the series of C, C/A, A, A/B, B, B/C will have the appearance of moving from left to right. Likewise, if you reverse the order of appearance then the appearance of movement will be to the left.

More than two image pictures can be used in the invention. Likewise, more than one bridging picture can be used in the present invention. For example, four image pictures can be used along with one bridging picture. In this case, the series for the four image pictures, designated A, B, D and E, would be: C, A, B, D, E; or a 50/50 blend C, C/A, A, A/B, B, B/D, D, D/E, B, E/C; or side-by-side pairs, C, C, A, A, B, B, D, D, E, E.

The image picture need not fill the picture frame. Furthermore, more than one image picture can be employed per frame. Thus, the picture frame can contain a cluster of images and the image or images need not necessarily filling up the entire frame. Also, only portions of image pictures can be used to form the image used in the present invention.

Also, image pictures and portions of the image picture can be combined such that the combination is used as the second image picture. The portion of the image picture is offset from the first image picture when they are combined such that there is an appearance of movement. For example, a window from image picture A can be moved slightly while the background remains the same, the picture with the moved window is designated image picture B and the two combined to create the appearance of the window moving and/or enlarging or shrinking in size. In this case, both picture A and picture B are identical except for the placement of the window in the image picture. The same can also be done by using an identical background in both image pictures and superimposing on both pictures an image which is positioned slightly different in each picture. The image could be a window, as before, of a man walking, for example.

The number of series which are put together can be finite if it is made on a length of film or infinite if it is set on a continuous cycle or loop wherein it repeats itself.

Broadly, the invention is a method for creating an appearance of continuous movement with a plurality of picture frames using three or more pictures, said method comprising:

a) selecting at least two image pictures, a first image picture and a second image picture, which are visually similar;

b) selecting a bridging picture which is dissimilar to said image pictures;

c) arranging said pictures in a sequential order to create a first series of pictures, said sequential order being one or more first image pictures, one or more second image pictures, one or more bridging pictures;

d) placing said first series of pictures on a plurality of picture frames wherein each picture of said first series is placed on a single frame; and e) repeating the first series of pictures a plurality of times to create a continuous plurality of picture frames having said first series thereon, such that when said plurality of picture frames are viewed, an appearance of continuous movement is perceived by a viewer Preferably, step (c) is replaced with the steps comprising:

(c1) blending said first image picture with said bridging picture to obtain one or more blended first-bridging picture;

(c2) blending said first image picture with said second image picture to obtain one or more blended first-second picture;

(c3) blending said second image picture with said bridging picture to obtain one or more blended second-bridging picture;

(c4) arranging said pictures in a sequential order of one or more bridging pictures, one or more of said blended first-bridging picture, one or more of said first image picture, one or more of said blended first-second pictures, one or more of said second image picture, one or more of said blended second-bridging picture to create a first series of pictures.

An artificial 3-D image can be achieved by the present Invention, as will be described in more detail below. Another way to obtain an artificial 3-D image is by a method of electronic switching of Pulfrich light-filtering before right or left eye, synchronized with screen action.

The start or end of the sequences doesn't matter since the sequence is placed in a continuous loop, however, the order of the pictures in the loop is critical in the practice of the present invention.

Figure 1B:
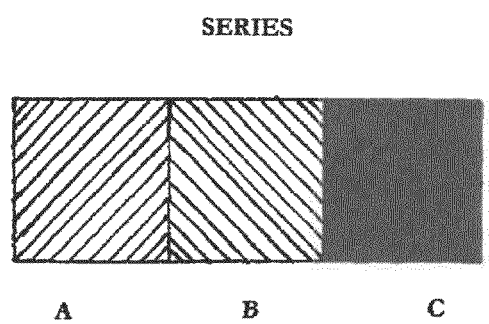
Figure 1C:
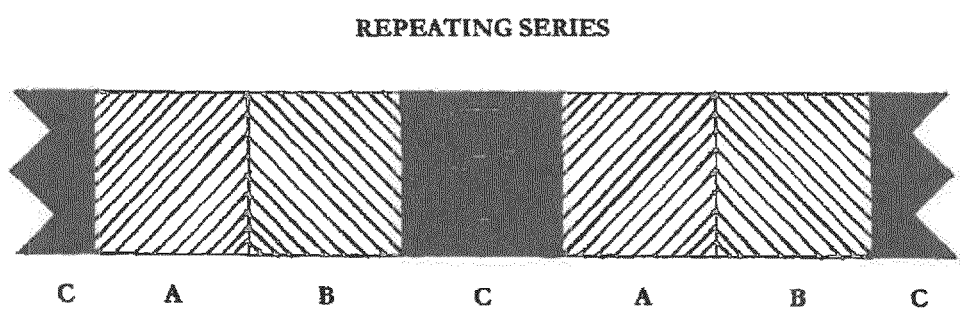
Figure 2A:
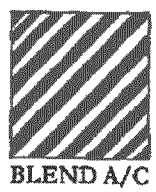
FIGS. 2 *a*-2 *c* illustrates the present invention using three pictures along with blended pictures.
Figure 2A:
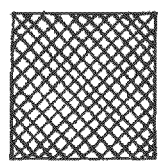
Figure 2A:
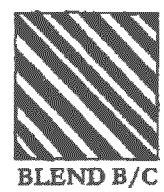
Figure 2B:
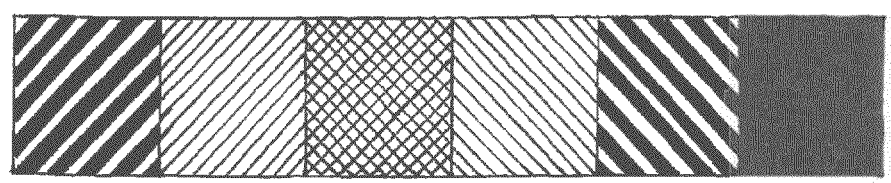
Figure 2C:
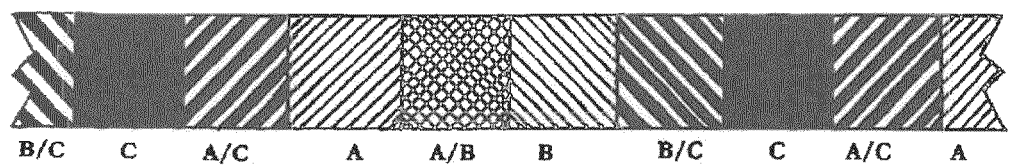

FIG. 1 *a* illustrates the three pictures that are employed in the method of this invention. Picture A, illustrated with lines slanting upward left to right, and Picture B, illustrated with lines slanting downward from left to right. Both pictures A and B are single frame photographs such as two side-by-side frames taken from a movie film showing movement of an object, for example, a woman walking down a street or a man walking his dog. Such side-by-side frames would be similar to each other but not identical. Picture C is a solid black picture.

In FIG. 1 *b* pictures A, B and C are arranged in sequential order, and placed on picture frames to form a series. In FIG. 1 *c* this series is then repeated to produce the appearance of movement by pictures A and B.

Turning to FIG. 2 *a* and the use of blended pictures, the three pictures are combined to produce a blend of C/A, blend of A/B and a blend of B/C by using Adobe Photoshop or another program to make a 50/50 blend of the three pictures.

In FIG. 2 *b*, all six pictures are placed side-by-side to create a series and the series is copied to create a continuous or semi-continuous film video or computer sequence where the series is repeated a plurality of times as shown FIG. 2 *c*.

Figure 3A:
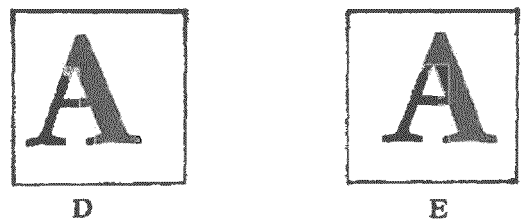
FIGS. 3 *a*-3 *c* illustrates the present invention using the same picture wherein one is offset from the other.
Figure 3B:
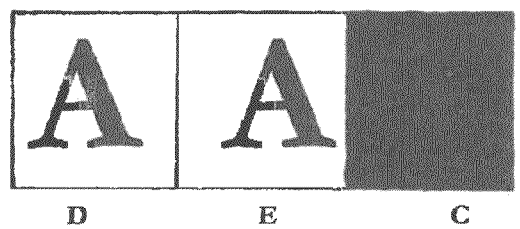
Figure 3C:
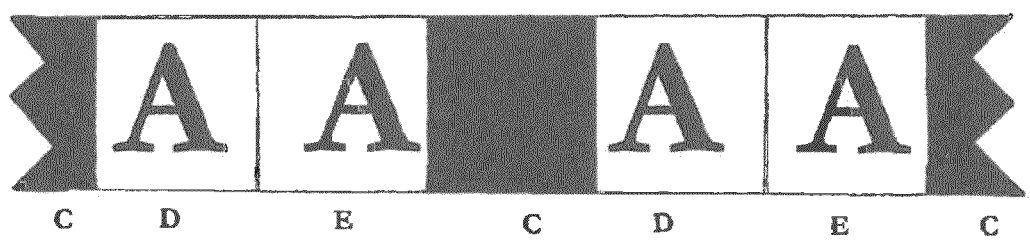

FIGS. 3 *a*-3 *c* illustrates an alternative three pictures that are employed in the method of this invention. Picture D and Picture E both illustrate a capital A, however, in Picture D, the capital A is aligned with the center of the frame while in Picture E the A is off-set to the right of the center of the frame (exaggerated here to be visible; in actual practice the displacement of figures might be so subtle as to not be discernable as illustrated here). Picture C is identical to Picture C in FIG. 1 a.

The capital A is chosen for FIGS. 3 a-3 c for illustration purposes and could be a single photograph of anything.

The three pictures are placed side-by-side to form a series. Finally, the series is copied a plurality of times to form a repeating series. The repeating series ih FIG. 3 c creates the optical illusion that the letter A is moving from left to right and, if one letter A were to be slightly different in size from the other, the letter would appear to be moving in depth, i.e. given a third dimension.

In FIGS. 3 a-3 c the background of Picture E is identical to the background of Picture D except that the image A is off-set slightly to the right.

Figure 4A:
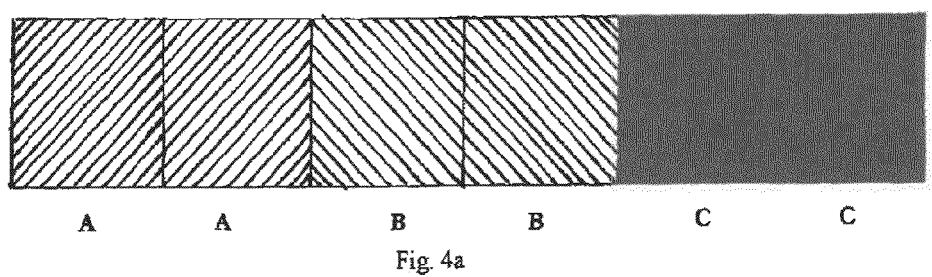
FIGS. 4 *a*-4 *b* illustrates the present invention with side-by-side pairs of pictures.
Figure 4B:
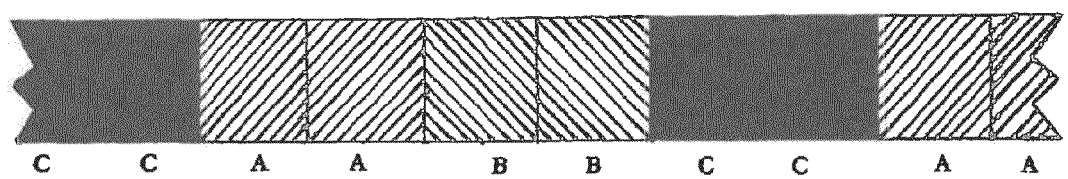

FIGS. 4 a-4 b illustrates the present invention where the series is two of each picture placed in side-by-side frames. It has been found that two pictures side-by-side are visually equivalent to a blend. In other words, a series of A, A, B, B, C, C is visually equivalent to a series of C/A, A, A/B, B, B/C, C.

Additionally, a series made in accordance with the present invention need not be uniform in that the pictures can be arranged to provide a different rhythm or beat to the film. For example, the series could be: C/A, C/A, A, A/B, A/B, B, B, B, B/C, C, C, C. Different arrangements provide different visual perceptions.

Furthermore, a plurality of different series can be combined together, i.e. C/A, A, B, B, C with C/A, C/A, A, B, B, C, C to form C/A, A, B, B, C, C/A, C/A, A, B, B, C, C.

Figure 5A:
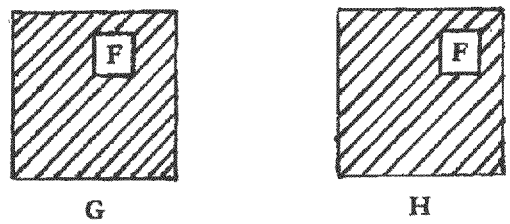
FIGS. 5 *a*-5 *c* illustrates the present invention wherein pictures G and H are identical but image F has been imposed in a slightly different location.
Figure 5B:
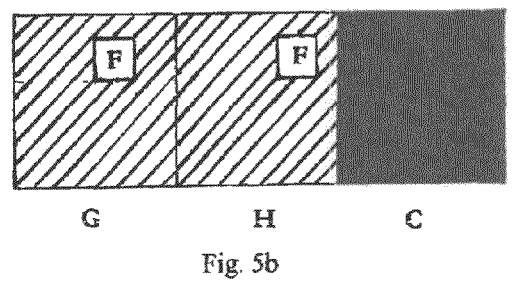
Figure 5C:
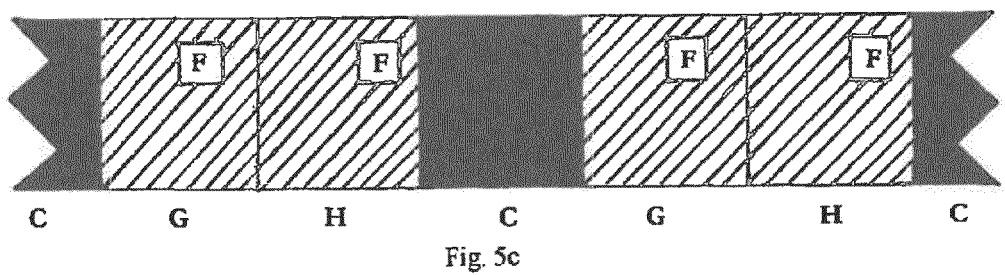
Figure 6A:
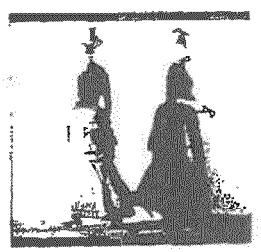
FIGS. 6 *a*-6 *c* illustrates pictures of two women in Eternalism with two pictures.
Figure 6A:
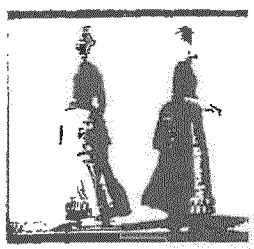
Figure 6A:
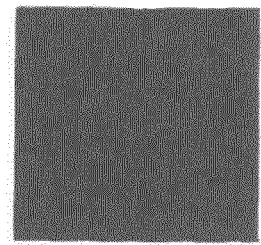
Figure 6B:
Figure 6B:
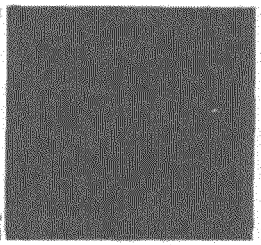
Figure 6C:
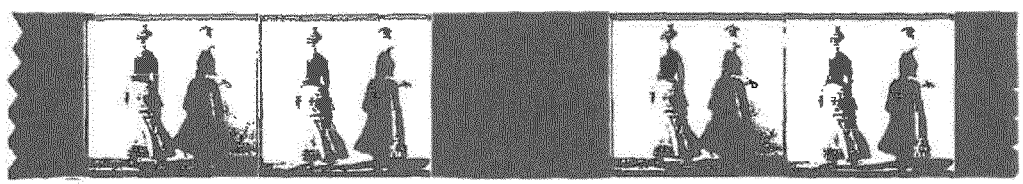

FIGS. 5 a-5 c illustrates the invention where both pictures are identical except for the position of a superimposed image F on the pictures. Image F could be taken from the original picture G or could be taken frond another picture, which is separate and distinct from pictures G and H. For example, pictures G and H could have the common background of a country side road while image F is a man walking his dog. In picture G, the man and his dog is placed at one location while on picture H the man and his dog is placed at a different location on the country road. By viewing the repeating of a series of G, H, C, a viewer is given with the impression that the man is walking his dog down the road, from top of the frame towards the bottom of the frame, appearing to be continually moving in the same direction without changing his actual position.

Furthermore, image pictures can be identical except that when they are arranged in the frame, one oriented slightly tilted relative to the other. The repeating series provides the visual perception that the picture is spinning.

Also, the size of or the orientation of image F in FIGS. 5 a-5 c can be varied while maintaining the location of image F. Varying the size gives the viewer the impression that the man is walking forward or backward, depending on the order in which pictures are arranged. Changing the orientation or tilting of image F leaves the viewer with the impression that the man is spinning.

The repeating series can be viewed in any media, it could be digitalized or placed on conventional film for viewing.

The movement created by the invention is seamless movement, sustained fluid entirely on-going movement.

Continuous movement means the illusion of a progressive action that can sustain as such into infinite time. For instance, a door beginning to open, it keeps beginning to open without ever progressing to the stage or actually opening. A door, in reality, in order to repeat this very limited movement, would have to move back and forth, recovering territory in order to go forward again, but in this visual illusion the door only moves forward. A normal film or video might approach this effect by multiple printing of the picture frames depicting only the forward motion, so that a return notion would be hidden from audience eyes, but the effect would be of a visual stutter; the action would be repeating, and not continuous. The "stutter" could be made less obvious and percussive by dissolving head frames of the shot into tail frames, but only with some subject matter (i.e., waterfall) might the repeat character of the motion not be apparent.

The appearance of transfixed continuous motion (a going without going anywhere) is created in this invention from a specific employment of flicker, the contrast created by viewing the slight shifting of a pictured form or forms between the image pictures in opposition to the bridging picture. Movies have always been dependent for their illusion of continuity on flicker-rates; silent movies filmed at 16 frames per second required 3-bladed shutters not only to block projection light during the successive replacing of frames but also to twice interrupt the display of each frame so as to achieve a flicker rate that the viewer would mistakenly see as uninterrupted light. Slow cranking of the film through the projector gave rise to "the flickers" as a pejorative. Video and computer image-continuity depends likewise on rapid on-off display. The present invention purposely makes flicker apparent, utilizing the effects of emphatic flicker on the human optical/nervous system to create uncanny time and space illusions.

Simple alternation of a single image picture with intervals of blackness (or any other interrupting color/s) is enough to create subtle illusions of continual sliding movement across the screen. Alternations of two image pictures with an interrupting interval of a solid colored picture provides any number of continuous motions, including motion into illusionistic depth. While such screening-illusions of movement and depth resemble movements and depths as seen in actuality; this is a creative artistic method and not intended as a reliable way of reporting the actuality that may have existed in front of a camera.

As noted above, no special viewing devices are required to view the present invention, although certain effects can be enhanced or put through interesting changes when viewed with a filter ter intercepting and reducing light to one eye; the "Pulfrich Effect".

Remarkably, with the present invention, depth illusions can be experienced even by the single-eyed person. Normally our perception of depth, stereopsis, depends on properly functioning binocular vision, two eyes working in tandem with each other; one of the benefits of this invention is to offer visual depth experience to those deprived of such experiences by physical defect. Because contrasting perspectival information is available to both or either eye, a single eye becomes sufficient to deliver the information to the brain when employing the present invention.

The present invention is best created on the computer, to be viewed on the computer or transferred to film or any video format. It can also be created directly onto film or video but the precision control possible with the computer is lacking.

The present invention can employ very small shifts in the placement of objects as seen in one picture in relationship to another similar picture. Such small object-placement shifts are also to be found in the simultaneously exposed pairs of frames made with a stereo still-camera, its two lenses placed horizontally apart approximately the distance between human eyes. The stereo still-camera offers object-placcment differences derived, as with our two eyes, from a fixed interval of space: the twin perspectives recorded by lenses 2½ inches apart. The degree of inter-ocular distance, as it is called, enormously affects the character of depth to be seen when the stereo-pair is properly viewed one picture to each eye; depth would seem very distorted, either too shallow or too extended (with other depth aberrations) if the distance between our eyes was not being matched by the two-lens stereo-camera.

In contrast to stereo-camera photography, with the single-lens motion picture camera (film or video), exploitable difference between like images arises from the interval of time between picture-exposures, during which the objects filmed shift in spatial relationship to each other; or/and the camera itself moves, capturing the 3-dimensional scene from another perspective, and thus shifting two-dimensional placement of pictured objects (which may not have moved in actuality) as recorded exposure to exposure. Because distance or direction traversed by the camera between exposures is not constant, nor movement by subjects recorded under photographer control, the visual equation of two-dimensional similarities and differences from which 3-dimensional movements will be constructed cannot produce scenes as reliably life-like as can simultaneous stereo-exposures with a fixed horizontal distance of 2½ inches between a pair of lenses. Eternalism 3-D movements made from sequential exposures are not intended to offer scientific data pertaining to reality but instead to provide odd and expressive impossible-in-reality impressions.

The stereo still-camera provides a pair of mentally combinable left and right eye flat image pictures; viewed one picture to each eye, similarities and differences are automatically assessed and a semblance of familiar depth is seen. We gaze from plane to plane into a seeming depth, the angling of our two eyes "crossing" for close objects and spreading to parallel alignment for very distant ones (Yet we remain focused on the same plane in depth, the actual plane of the picture surface; in life, we constantly refocus as well as angle for different distances.) We are not conscious, either in actual life or when looking into such artificial depths, of the doubling of forms (as they fall back into 2-dimensionality) at distances that we are not at the moment angling for. This automatic angling operation of the eyes cannot happen when looking with both eyes at the same territory of flat picture surface. The coinciding of opposing 2-dimensional perspectival viewings of an object (by which volume can be conceived by the mind) must be done for the viewer, a task greatly enabled by the computer.

The present invention revolves each set of picture-units in place, but if a figure from one perspective is not placed in a correspondingly similar position in its frame (and in matching horizontal alignment) with its representation as recorded from another perspective, there is only a 2-dimensional jiggering with no volume illusion or continuous direction of movement created. With the computer, one can slide and place one picture, or an area of that picture, into exact relationship with a matching picture or area so as to achieve the precise effect desired. (A recorded object becomes an area within a flat picture-image.) The slightest advance in a particular direction of the contour of one area in relation to its match-up area determines movement in that direction. Slight shrinking or enlargement of one area compared to the other creates a "zooming" in or out effect. A problem in overlaying one entire picture over another in order to match up one area usually means other areas will not coincide, not synchronize; but the computer allows for each area to be matched separately and inlaid into the scene according to one's depth-movement intentions for each area. The crazy-quilt artificiality of a scene can be hidden or obvious, its parts drawn from a single-pair source of related images or from as many sources as desired. Photo-images can be mixed with or replaced by drawn and painted imagery. The scene can imitate real life one moment and veer of into impossibility the next.

Again, although only two image pictures are usually cycled, more than two can be worked into a cycle to create a particular effect. Following and inventing variants on the directions above, and the formula as described below for sequencing frames, will create the impression of solid entities moving in a charmed dimension where normally transient physical gestures can endure forever. In fact, computer interactivity can mean the viewer deciding how long the effects of each series continues. Further interactivity will give the viewer the option to place picture of his/her own choice into this unique cycling system.

FIGS. 6 a-6 c shows two phases of an action, A & B, plus black bridge-frame C. We see the pictures separately in FIG. 6a; made sequentially adjacent to each other in FIG. 6b and presented as a repeating series of pictures, as a "loop" or "cycle", in FIG. 6c.

Figure 7A:
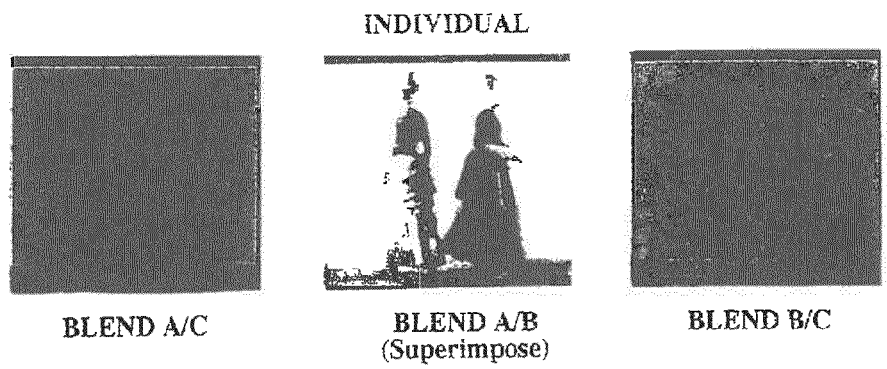
FIGS. 7 *a*-7 *c* illustrates the women of FIG. 6 with a 50-50 blend between the women and the women and the bridging frame.
Figure 7B:
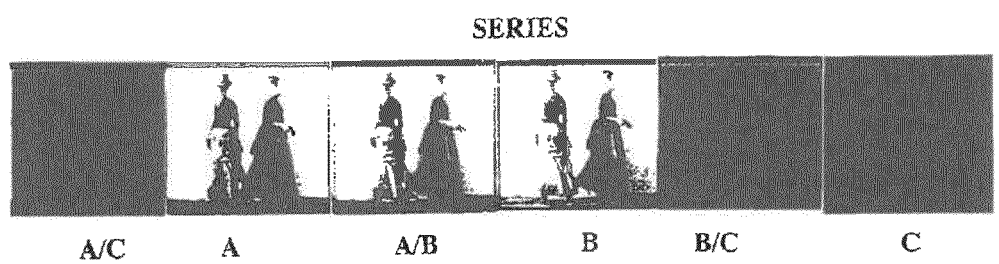
Figure 7C:
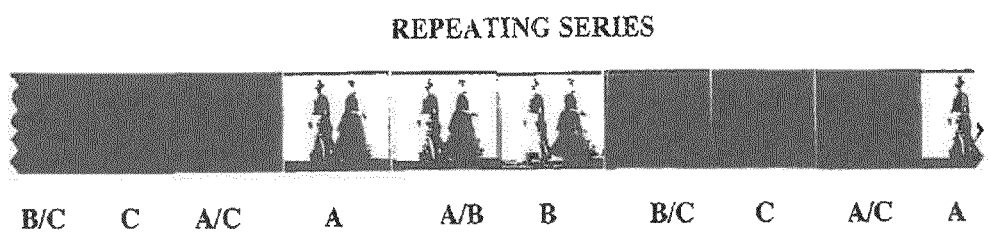

FIG. 7 a demonstrates the creation of intermediary or blended frames between A, B and C, which are 50-50% blends producing A/C, A/B & FIG. 7 b shows them in sequence and FIG. 7 c shows them repeating as an ongoing loop.

Figure 8B:
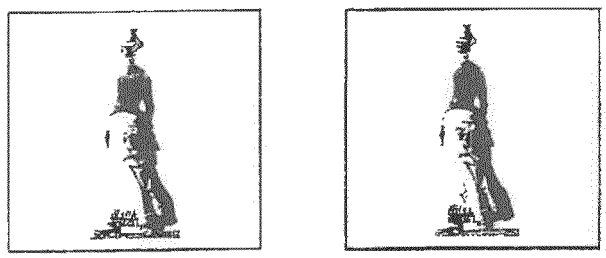
FIGS. 8 *a*-8 *c* illustrates the same women in two different perspectives (not apparent to normal viewing as pictured here), joined to create an Eternalism.
Figure 8B:
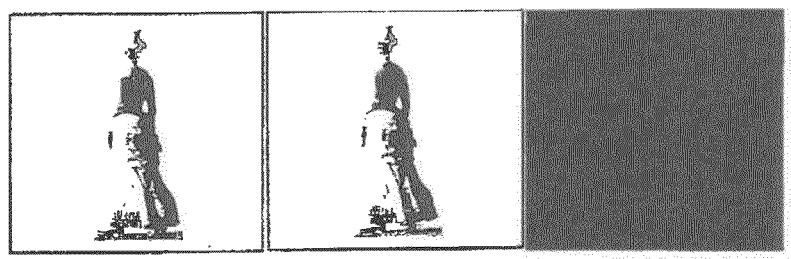
Figure 8C:
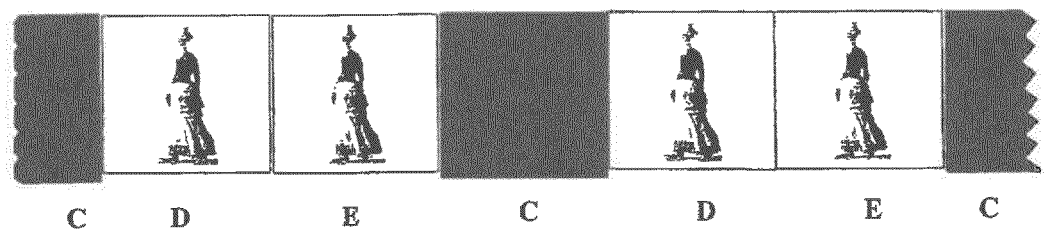

FIG. 8 a shows one figure in isolation, removed from the previous scene. Pictures D & E may appear identical but are actually two different perspectives which together make possible a 3-dimensional figure. While the recording camera remained in a fixed position the figure moved before it, frame after frame, making two perspectives possible. Because the figure moved to different positions in the two film frames, it was necessary to move one figure in one frame so that both figures would occupy the same location in both frames. It is now possible to see them as a single 3-dimensional figure when the frames cycle in quick succession together with the bridge frame as shown in FIG. 8 c.

Figure 9A:
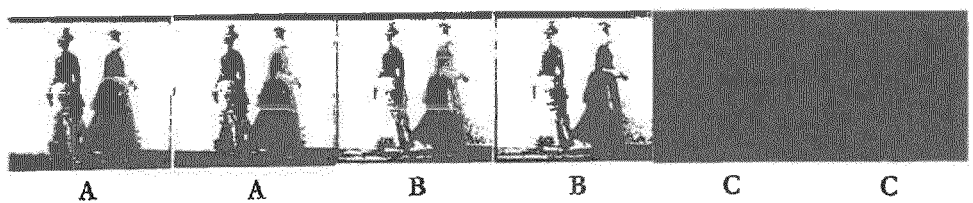
FIGS. 9 *a*-9 *h* illustrates the doubling of the frames from FIG. 6.
Figure 9B:
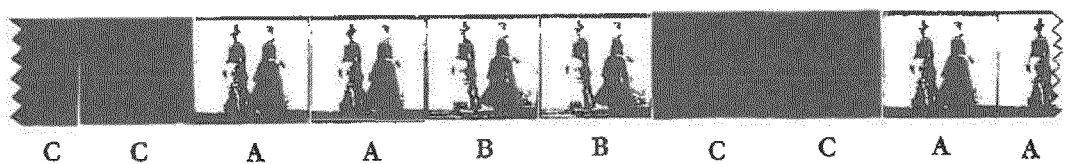

FIGS. 9 a and 9 b represents the doubling of each frame in an A,B,C series.

Figure 10B:
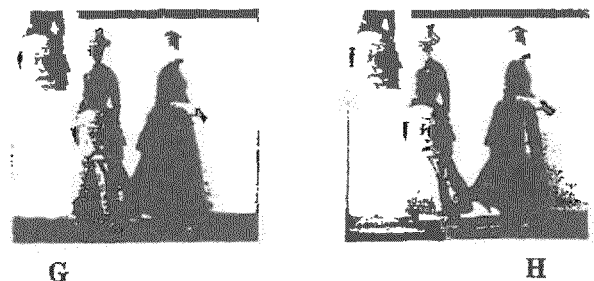
FIGS. 10 *a*-10 *c* illustrates the two women with a smaller frame depicting a portion of one woman repeated and overlayed in the upper left-hand corner of the frame to create a separate depth-configuration within the larger frame.
Figure 10B:
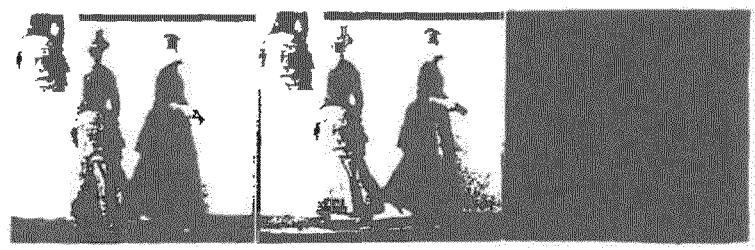
Figure 10C:
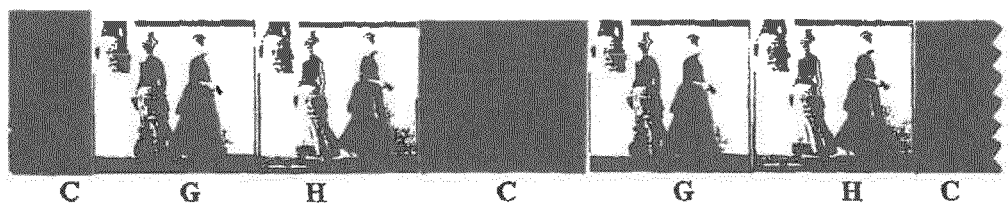

FIGS. 10 a-10 c shows a section of picture G & H is repeated in the upper left corner. When observed in quick succession this series will show the two center figures in one configuration of depth and the inset series as an opposing configuration of depth. Left eye/right eye views as placed in G & H are reversed in the inset figure, so that parts of the figure that (3-dimensionally) approach the viewer in the larger picture are seen to retreat away from the viewer in the smaller picture, and vice versa.

Figure 11:
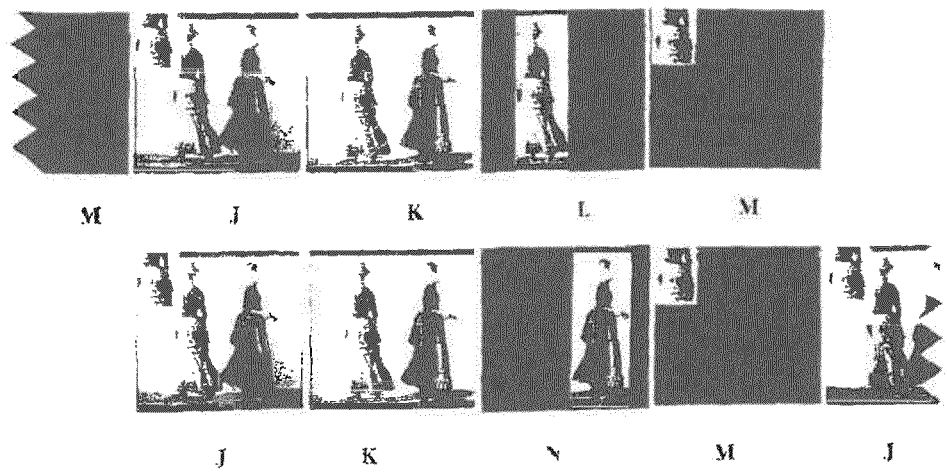
FIG. 11 illustrates a combination of the two women with a portion of the one woman both in the bridging frame as well as in one of the frames that contain both women.

FIG. 11 illustrates two sets of four; with both similarities (J, K, M) and differences (L, N) between the sets, including in the upper left corner an action that straddles bridging frame (M) and picture frame (J). Note the bridging frame is not completely blank or colored.

Figure 12:
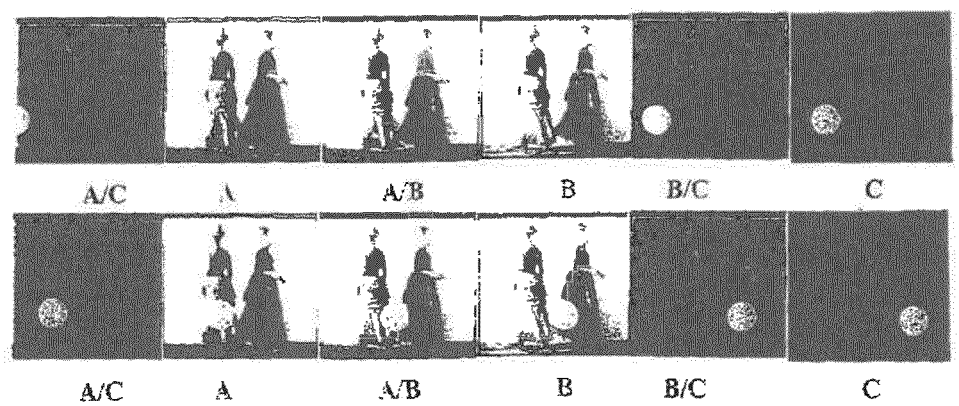
FIG. 12 illustrates Eternalism with two women and a circle moving through the frames.

FIG. 12 illustrates an example of an Eternalism effect coexisting with more normal screen action, and of an Eternalism repetition taking place but with no two frames exactly alike: a visual element (the circle) proceeds frame to frame throughout as it would in a normal movie, unaffected by Eternalism looping. Again, note that the bridging frame is not completely blank.

Figure 13:
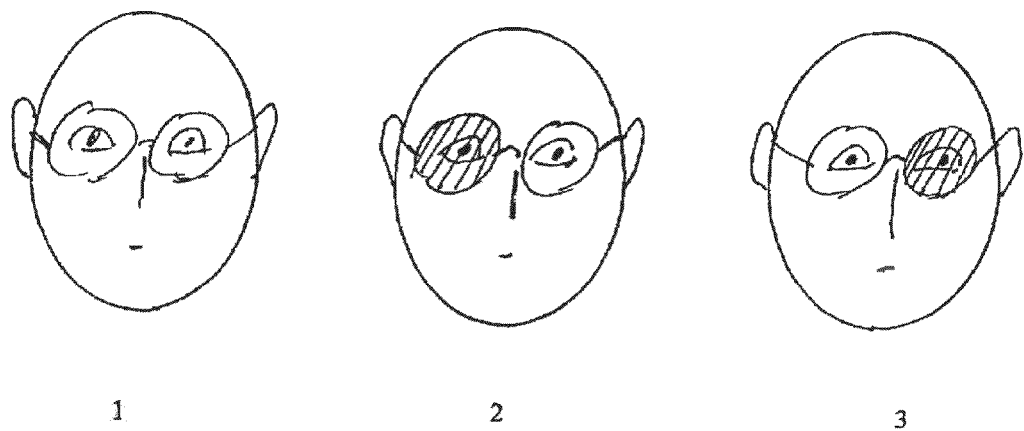
FIG. 13 illustrates the Pulfrich filter.

FIG. 13 is an illustration of Pulfrich filter spectacles: (1) clear; (2) activated to partly block light reaching figure's right eye; (3) activated to partly bock light reaching figure's left eye. Liquid crystal reaction is one method of achieving the blocking effect.

The invention can also be described as follows:

In the Pulfrich filter effect, interference by the light-reducing filter has the effect of retarding the light that does pass through it to the eye. As long as forms and objects are changing position relative to each other as pictured frame to frame, a delayed picture seen in combination with a present-moment picture offers two slightly different pictures simultaneously to the mind. Thus an artificial three-dimensional image can be produced by the mind utilizing the same mechanisms that allow it, in viewing actuality, to produce a three-dimensional mental image from the pair of two-dimensional perspective-images received from horizontally adjacent eyes. The artificial 3-D image can be said to depend on a variable report of actuality. A Pulfrich filter used to view actual three-dimensional space will distort that space (assuming the scene is in motion). Similarly, depth in a screen image can be distorted, and in manifold ways, including reversal of near and far and direction of motion flow. Such distortions can have expressive artistic value.

The Pulfrich Effect, triggered (as described above) to accord with pictured directional motion on-screen, would have applications beyond use with Eternalized movies. Video games and other video movies featuring extended screen movements to left or right could, in many instances, be enhanced for viewers by Pulfrich projection into three-dimensional depth. For many such screen events for instance, a scene filmed or videotaped from a moving vehicle, especially perpendicularly, with the camera aimed at or close to a 90 degree angle from the side of the vehicle, convincingly realistic deep space would result. A stipulation of realistic deep space, as made available by the Pulfrich Effect, is that the partial light-absorbing filter be before the eye on the side to which the pictured foreground objects are seen to move. If filming or videotaping was to be done with the camera aimed perpendicular to a vehicle's path of movement, and the camera was on the driver's side, motion onscreen would flow screen-left, and the Pulfrich filtering would therefore have to take place before the left eye; thus the need to switch dark-filter placement from eye to eye in accordance with direction of screen movement. The filter works best when there is essentially horizontal movement; when viewing an unmoving or inappropriate image, both left and right eye filters should clear. Presented as electronic media, such images would benefit from timed application of appropriate Pulfrich filtering. This aspect of the invention would allow 3-dimensional movies to be created and presented (less spectacles) with the same cinema technology used for making and presenting ordinary 2-dimensional movies.

Description of the Eternalism Optical Phenomena

The idea of an interval of action running in place without apparent beginning, middle and end, forever swelling or turning or rising or opening, forever seeming to evolve without ever actually doing so (until given a determined release into a further phase of development), can be literally unimaginable, so alien is it to our experience. Neither in life or on film or in electronic imagery has it been possible to create the optical illusion of a door forever cracking open or a muscle rippling or head turning or any other limited gesture continuing as such into potentially unlimited time—until advent of this invention. We have termed this phenomenon Eternalism, and we speak of pictured forms or objects, scenes or gesture being Eternalized into Etemalisrns. A further benefit of this invention is enhanced 3-Dimensionality of Eternalized images, a 3-D that can be reasonably life-like or radically at odds with depth as we know it, Consider, for example, the action of a door opening. And select from that entire action only the fraction of time that it would take for the door to just begin to open, as it cracks open a narrow space alongside the doorframe, with the outer edge of the door swinging over little more than an inch of flooring. Designating this very limited time-space interval as a movie "shot". The most minimal movie shot possible, it consists of only two running frames of film or video.

In reality, there would be no way to sustain into unlimited time the very limited action of the door cracking open; to keep opening and only opening yet never moving past that very limited phase of just cracking open. This motion is not repeated but sustained. The reality, of course, is that to remain in motion, and in forward motion only, one would have to move the door to a further phase of motion: the door would have to open wider. And the designated space-time interval would be left behind.

This is similar to someone walking against the direction of a conveyer belt walkway (as at an airport) and at exactly the same speed of the conveyer belt, continually walking forward yet getting nowhere. The Eternalism technique is a sort of cinematic conveyer belt moving in an opposing direction to any moving image placed on it.

It is a conveyer belt with a beat, a flicker, a visual beat capable of supple changes. In the history of cinema, flicker—referring to visible intervals of darkness between flashes of successive film-frames, intrusive reminders of the mechanical basis of the cinematic illusion—has been a pejorative term. To commercially entertain, the technology needed to quickly outgrow flicker. Yet in doing so some other illusionistic potentials of the art, very curious departures from life-like representation discovered, their expressive potential left untapped, until now.

Method

Visible flicker is essential to Eternalism technique, which investigates and utilizes different intensities of emphasis, frame choices and frame-counts of flicker in order to create entirely new illusions to augment cinema's repertoire of visual effects. Today's audiences are entirely receptive to non-realistic representation, the textures of visual technologies are no longer unwelcome onscreen. Visible flicker does sometimes appear in movies in purposeful ways, usually representing lightning or machine-gun bursts, and even as rhythmic hits of light-energy, but not with the methodology and results of Eternalisms.

No less than three basic units, two pictures and a bridge-interval (A, B, C), are necessary to create an Eternalism, even when picture B might be only a slight modification, a shifting or size reduction or expansion or tilting, etc. of picture A. On the simplest level, the series of units would proceed: A, B, C, A, B, C, A and so on. Each unit interval may be of any effective time duration, an effective smooth-working duration for computer assembling is two frames per unit, shown here as A,A, B,B, C,C, A,A, B,B, C,C, A,A and so on. It is sometimes desired to insert transitional frames, usually 50/50% (percentage mixture may vary) superimposed frames of adjacent units, shown here as: A, A/B, B, B/C, C, C/A, A and so on.

Additionally, all re-appearances of the basic cycling units comprising an Eternalism needn't be exactly the same. Strict mechanical repetition can give way to flexible variation within the limits imposed by what is necessary to sustain the motion/depth illusion (unless one chooses to abandon the illusion entirely for a period of time; it is expected that for commercial movie use of the method, that the effect would be used intermittently, for selected scenes). Any number of factors comprising a unit-sequence may be altered from appearance to appearance as it cycles, including colors, shapes, placement of shapes, objects pictures, unit duration, etc., so that the same Eternalism would seem to remain in play while going through subtle or even vibrant internal changes, before being replaced by a successive phase of motion or a distinctly other selection of picture/interval units. Change in the order of units, such as A, B, C, A, B, C, A being replaced by B, A, C, B, A, C, B would initiate an immediate reversal in direction of pictured movement. Varying durations of units within an Eternalism or traveling from Eternalism to Eternalism may not only make for desired beat and rhythm changes but also affect the apparent character of motion and/or depth in interesting ways. A composer of a series may even choose to play against its smooth continuity by momentary unit-replacement or interjection by other picture units, as for instance: A,A, B,B, C,C, A,D, B,B, C,E,C, A,A. The entire screen may Eternalize with the same sequential rhythm (usually the case) or different parts may sequence with different rhythms to different pictorial effect.

Many techniques commonly in use in computer and hand-crafted movie animation can be adapted to Eternalism use. For instance, similar to screen combinations of photographed reality with animation cartooning, only a section or sections of the screen image may be Eternalized while normal movie motion proceeds in other sections. Or a figure in normal motion may move through an Eternalized scene. Or, among other combination possibilities, a smaller Eternalism (which can be an object or shape or a separately framed scene) may be imbedded within a larger Eternalism, or may float before it, or move—substantial yet ghostlike—through it.

Stereo Vision and Special Requirements of Eternalism Composition

Eternalism images may be so composed as to create an impression of 3-dimensional volume, designed to appear more or less realistic, but never with the degree of realism as to fool anyone that they are other than images. No one will ever attempt to sink a hand into one to grab at passing fish as children do at Sony I-MAX. Eternalism depth is readily apparent and yet more problematic, as is its character of movement. Depth isn't simple there to be taken for granted, but seems constantly caught in the act of being generated out of flat elements. Eternalism is an illusion of depth. Our minds are given the task of entertaining together two conflicting impressions: of things simultaneously appearing both flat and deep. However, the degree of 3-dimensionality that is there can be seen without need of special viewing devices of any sort, and in fact can be seen by many persons normally deprived of any 3-dimensional vision (those missing sight in one eye, for instance).

Depth as well as ongoing movement must be artificially composed in the making of Eternalisms. Calculated placement of areas to be brought into working correspondence within a picture A and picture B is of paramount importance.

It does happen that images are recorded on film or in electronic media that work effectively enough when sequentially overlayed with each other as-is, so as to need little or no cut-and-paste rearrangement. But more often there are areas not adequately corresponding in sequential location and therefore, when alternated quickly, will merely bounce back and forth from place (in A-frame) to place (in B-frame). In normal stereo-vision ones two eyes angle in and out from parallel alignment as they match corresponding areas on their two retinal images. Each retinal image is in fact 2-dimensional; 3-dimension vision is a result of this muscular matching, this pulling-into-alignment activity performed by muscles surrounding the eyes (as dictated to by viewers focus of interest) activity by the eyes and the mental comparing and processing of like and unlike information sent by each eye to the brain. Only within a very limited interval of actual depth, up to about twenty five feet distance for most humans, can we effectively shift and overlay forms so as to discriminate depth accurately (eyes work in parallel beyond that distance, with greatly reduced depth distinction). The closer to the eyes the target of focus, the more the eyes have to cross, and the different degrees or angles of crossing demanded as things approach or recede means that while one layer of depth will be properly shifted to overlay figures, others will not be. Selective focusing and shift in real-life visual experience, selectively attending to the 3-D figures creates in the mind, while ignoring—helped by a "dominant eye"—the remaining non-overlayed and doubled flat figures remaining in the twin fields of vision, peripheral to the focus of attention.

Ignoring such peripheral mismatchings in Eternalisms does not come so naturally. Because the image pictures alternate in appearance, they don't quietly superimpose (with one image largely discarded from mind due to our having a "dominant eye"): non-overlayed areas will tend to jiggle and bounce, usually a distraction. Unless that is the effect wanted in a particular instance, the procedures of artificially overlaying A and B picture-areas for the viewer will be carried out throughout an Eternalism composition, into all peripheral areas of the picture. Again, this can be done employing computer graphics cut-and-paste techniques, with the filling of areas left emptied (by removal or shifting of a form) usually accomplished by the extending of adjacent colors.

Picture-frames A and B may be near-identical or have only some elements with close visual correspondence. Similarity of shape and location within the frame are important factors determining the effect. This is true to the point that entirely different pictured objects but of similar shape and on-screen location will give better results than two images of the same object recorded from perspectives too far apart or placed too far apart within consecutive frames, in which case the images will be seen to vibrate or bounce back and forth without visually combining into a single moving form. While matching image elements in pictures A and B must occupy almost the exact screen-space in order to combine properly, it will be the differences between them (within close tolerances) that will produce and determine the character of movement and dimensionality. Computer graphics cut-and-paste techniques can be used to select and place, shrink and expand and otherwise manipulate matching elements (from any source) into effective screen-locations relative to each other. One or both pictures may be collaged or stitched together from multiple sources, parts may be removed or inserted, lifted and reshaped or/and relocated. Even when the image is photographed from life and appears life-like, the process of composition can be as exacting and labor-intensive and involved with techniques of artifice as cartoon animation.

EMBODIMENTS

In practice, the implementation of this technique opens up a new world of visual effects. Its uncanniness may be emphasized to create unsettling time-space aberrations for comic or dramatic effect in movies. Or, aiming for more realistic appearance, the method could be used to provide more lively "snapshots" of familiar things and events. For instance, people could carry, programmed into a Palm Pilot-type "electronic wallet", a great many (low memory demanding) moving replicas of loved ones in characteristic living gestures, with heightened 3-dimensional presence. Even very limited movement, limited 3-dimensionality, can enormously augment and reinforce visual information: i.e., a child's face breaks into a smile. Again, the very low demand of electronic memory by an Eternalism (cycling as few as two picture-frames with an interval of darkness), makes possible extensively illustrated electronic catalogues or even encyclopedias, supporting hundreds and eventually thousands of Eternalized illustrations. A reader-viewer might observe a home appliance in operation. Or study a visual sampling of an ocean wave breaking in its sweep to shore, study it as has never been possible before, forever breaking from peak ascendancy. One may study a springing cat, sheath of muscles sliding over ribs continually, available for sustained observation; or follow a clear demonstration of the direction a screwdriver must turn to further imbed a screw. Any number of instances where stereo-dimensional action (often audio-accompanied, as audio also demands little computer memory) would communicate so much more than a still and flat image, or even a moving but flat image.

In accordance with another embodiment, a method of displaying one or more frames of a video is provided. Data comprising a compressed image frame and temporal redundancy information is received. The image frame is decompressed. A plurality of bridge frames that are visually dissimilar to the image frame are generated. The image frame and the plurality of bridge frames are blended, generating a plurality of blended frames, and the plurality of blended frames are displayed.

The basic idea of video compression is to remove spatial area redundancy within a video frame (e.g. as done with Fax transmissions) and temporal redundancy between video frames. Since the successive frames in a video stream usually do not change much within small time intervals, the temporal redundancies can be used to encode and compress a video frame based on other video frames temporally (successively or previously) close to it, As an example, MPEG compressed video files record a 16×16 pixel area (referred to as a macro block) of a frame of a motion picture, and then for successive frames only record a motion vector describing the motion of the macro block. In MPEG compression the motion vector has a horizontal and vertical part, each part ranging from −64 to +63 with a positive value indicating that the macro block moves to the right or downward respectively. Any macro block can move up to 64 pixels laterally and vertically between frames. (MPEG compression tracks not just rigid rotation but also macro block rotation.) High compression rates are achievable for moving pictures in part because the next successive frame of a motion video consists in the main of identical information. For instance, if the camera is fixed, the background information for a scene will be mostly identical between the frames of the scene. Most macro blocks will have an associated numerical notion vector indicating the macro block has not moved. In those cases where the macro block exhibits motion between frames, the macro block will have an associated numerical motion vector quantifying where the macro block has moved. In either case, only the motion vector needs to be recorded in the compressed file, not the redundant macro block. Software-based (e.g. Microsoft Media Player) and hardware-based (e.g., DVD) video players can read a compressed file and decompress it back to a video stream for display on a monitor device for viewing.

This has great advantages over previously described methods since it relies on motion vector descriptors that are pre-calculated and stored in the compressed video file, and does not require real-time image processing.

The discussion herein refers to MPEG compressed video files as two examples of video file formats that could be used by this invention. While the preferred embodiment of the invention will demonstrate the principle using just the MPEG format, it should be clearly understood that the principles disclosed in the invention could be used by any video compression technique that relies on temporal redundancies. Other formats, such as QuickTime, may be used.

Video File Data Compression

Video compression refers to reducing the quantity of data used to represent digital video images, and is a combination of spatial image compression and temporal motion compensation. Compressed video can effectively reduce the bandwidth required to transmit video via terrestrial broadcast, via cable TV, or via satellite TV services.

Most video compression is lossy—it operates on the premise that much of the data present before compression is not necessary for achieving good perceptual quality. For example, DVDs use a video coding standard that can compress around two hours of video data by 15 to 30 times, while still producing a picture quality that is generally considered high-quality for standard-definition video. Video compression is a tradeoff between disk space, video quality, and the cost of hardware required to decompress the video in a reasonable time. However, if the video is over-compressed in a lossy manner, visible (and sometimes distracting) artifacts can appear.

Video compression typically operates on square-shaped groups of neighboring pixels, usually called macro-blocks. These pixel groups or blocks of pixels are compared from one frame to the next and the video compression records only the differences within those blocks. This works extremely well if the video has no motion. A still frame of text, for example, can be repeated with very little transmitted data. In areas of video with more motion, more pixels change from one frame to the next. When more pixels change, the video compression scheme must send more data to keep up with the larger number of pixels that are changing. If the video content includes an explosion, flames, a flock of thousands of birds, or any other image with a great deal of high-frequency detail, the quality will decrease, or the variable bitrate must be increased to render this added information with the same level of detail.

Video data contains spatial and temporal redundancy. Similarities can thus be encoded by merely registering differences within a frame (spatial), and/or between frames (temporal). Spatial encoding is performed by taking advantage of the fact that the human eye is unable to distinguish small differences in color as easily as it can perceive changes in brightness, so that very similar areas of color can be "averaged out" in a similar way to jpeg images. With temporal compression only the changes from one frame to the next are encoded as often a large number of the pixels will be the same on a series of frames.

One of the most powerful techniques for compressing video is interframe compression. Interframe compression uses one or more earlier or later frames in a sequence to compress the current frame, while intraframe compression uses only the current frame, which is effectively image compression.

The most commonly used method works by comparing each frame in the video with the previous one. If the frame contains areas where nothing has moved, the system simply issues a short command that copies that part of the previous frame, bit-for-bit, into the next one. If sections of the frame move in a simple manner, the compressor emits a (slightly longer) command that tells the decompresser to shift, rotate, lighten, or darken the copy—a longer command, but still much shorter than intraframe compression.

MPEG-1 Video Compression Standard

The Moving Picture Experts Group (MPEG) was formed by the International Organization for Standards (ISO) to set standards for audio and video compression and transmission.

Its first meeting was in May 1988, and by 2005, MPEG included approximately 350 members per meeting from various industries, universities, and research institutions. MPEG's has developed several sets of standards referred to as MPEG-1, MPEG-2, MPEG-3 and MPEG-4, and is continuing to work on other video compression standards.

MPEG-1 is an ISO/IEC (International Organization for Standardization/International Electrotechnical Commission) standard for medium quality and medium bit rate video and audio compression. It allows video to be compressed by the ratios in the range of 50:1 to 100:1, depending on image sequence type and desired quality. The MPEG-1 standard is one of many video file compression technique that use spatial redundancy and temporal redundancy to reduce the size of the digital video file with little noticeable loss from the originally uncompressed digital version. The MPEG-1 standard is still widely used even though it is more than 15 years old is still widely used. The preferred embodiment of the invention will use the MPEG-1 video compression standard to demonstrate the principles of the invention. However, it should be clearly understood that the principles disclosed in the invention could be used by any video compression technique that relies on temporal redundancies to achieve compression of video data. Thus, the invention is not restricted to just MPEG-1 or other MPEG compression standards. The invention may be applied using any compressed video file associated with a compression fore, at that uses temporal redundancy to achieve compression of video data.

In MPEG-1, a video stream is a sequence of video frames. Each frame is a still image, and a video player decompresses an MPEG-1 bit stream and displays one frame after another to produce the motion video. When a motion video is compressed, MPEG-1 video compression removes both spatial redundancy within a video frame and temporal redundancy between video frames. The compression algorithms exploit several techniques to remove spatial redundancy but most importantly for this invention is its use of motion-compensation to remove temporal redundancy. Since the images in a video stream usually do not change much within small time intervals, and the idea of MPEG-1 motion-compensation is to encode a video frame based on other video frames temporally close to it.

A MPEG-1 compressed digital file is a sequence of three kinds of frames: an I-frame, a P-frame, and a B-frame. The I-frames are intra-coded, i.e. they can be reconstructed without any reference to other frames. The P-frames are forward predicted from the last I-frame or P-frame, i.e. it is impossible to reconstruct them without the data of another frame (I or P). The B-frames are both forward predicted and backward predicted from the last/next I-frame or P-frame, i.e. there are two other frames necessary to reconstruct them. P-frames and B-frames are referred to as inter-coded frames.

Whether a frame of video is coded as an I-frame, P-frame, or B-frame, the frame is processed as micro-blocks. A micro-block is a square array of 16×16 pixels, and is the unit for motion-compensated compression. If a video frame has a resolution of 320×240 pixels the MPEG-1 bit stream will reference this frame with respect to 20×15=300 macro-blocks.

An I-frame is encoded as a single image, with no reference to any past or future frames. The encoding scheme used is similar to MEG compression. Each 8×8 block is encoded independently with one exception explained below. The block is first transformed from the spatial domain into a frequency domain using the DCT (Discrete Cosine Transform), which separates the signal into independent frequency bands. Most frequency information is in the upper left corner of the resulting 8×8 block. After this, the data is quantized. Quantization can be thought of as ignoring lower-order bits (though this process is slightly more complicated). Quantization is the only lossy part of the whole compression process other than subsampling. The resulting data is then run-length encoded in a zig-zag ordering to optimize compression. This zig-zag ordering produces longer runs of 0's by taking advantage of the fact that there should be little high-frequency information (more 0's as one zig-zags from the upper left corner towards the lower right corner of the 8×8 block). The afore-mentioned exception to independence is that the coefficient in the upper left corner of the block, called the DC coefficient, is encoded relative to the DC coefficient of the previous block (DCPM coding).

A P-frame is encoded relative to the past reference frame. A reference frame is a P- or I-frame. The past reference frame is the closest preceding reference frame. Each macro-block in a P-frame can be encoded either as an I-macro-block or as a P-macro-block. An I-macro-block is encoded just like a macro-block in an I-frame. A P-macro-block is encoded as a 16×16 area of the past reference frame, plus an error term. To specify the 16×16 area of the reference frame, a motion vector is included. A motion vector (0, 0) means that the 16×16 area is in the same position as the macro-block we are encoding. Other motion vectors are relative to that position. Motion vectors may include half-pixel values, in which case pixels are averaged. The error term is encoded using the DCT, quantization, and run-length encoding. A macro-block may also be skipped which is equivalent to a (0, 0) vector and an all-zero error term. The search for good motion vector (the one that gives small error term and good compression) is the heart of any MPEG-1 video encoder and it is the primary reason why encoders are slow.

A B-frame is encoded relative to the past reference frame, the future reference frame, or both frames. The future reference frame is the closest following reference frame (I or P). The encoding for B-frames is similar to P-frames, except that motion vectors may refer to areas in the future reference frames. For macro-blocks that use both past and future reference frames, the two 16×16 areas are averaged.

The MPEG-1 bit stream for both P-frames (forward predicted), and B-frames (forward and backward predicted) have motion vectors explicitly or implicitly associated with each macro-block. A P-frame of the motion video file with a resolution of 320×240 may have as many as 300 motion vectors describing the movement of the macro-blocks from the most recent I-frame or P-frame. A B-frame of the motion video file will similarly have up to 300 motion vectors describing the movement of the macro-blacks from last/next I-frame or P-frame.

As an example, consider a single macro-block. A following P-frame shows the same triangle but at another position. Prediction means to supply a motion vector that determines how to move the macro-block from an I-frame to the P-frame. This motion vector is part of the MPEG stream and it is divided in a horizontal and a vertical part. These parts can be positive or negative. A positive value means motion to the right or motion downwards, respectively. A negative value means motion to the left or motion upwards, respectively. The parts of the motion vector are in the range of −64 . . . +63. So the referred area can be up to 64×64 pixels away.

An I-frame is intra-coded and cannot refer to another frame so it cannot have any motion vectors. However, the inter-coded P-frames and B-frames have motion vectors for each macro-block and are used by this invention to calculate for their respective frames the 'Characteristic 3Deeps Motion Vector' necessary to calculate the optical densities of the lenses of the 3Deeps Filter Spectacles.

In accordance with an embodiment, data comprising a compressed image frame and temporal redundancy information is received. The image frame is decompressed. A plurality of bridge frames that are visually dissimilar to the image frame are generated. The image frame and the plurality of bridge frames are blended, generating a plurality of blended frames, and the blended frames are displayed.

Figure 14:
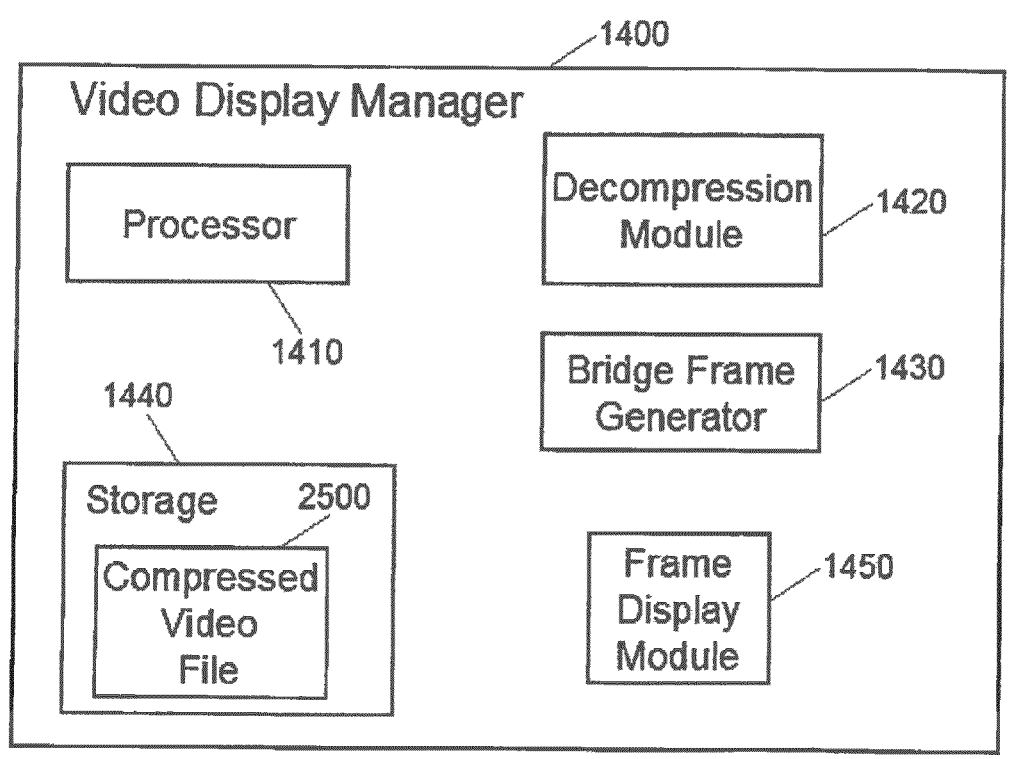
FIG. 14 shows components of a video display manager in accordance with an embodiment.

FIG. 14 shows a video display manager that may be used to implement certain embodiments in accordance with an embodiment. Video display manager 1400 comprises a processor 1410, a decompression module 1420, a bridge frame generator 1430, a frame display module 1450, and a storage 1440.

Figure 15:
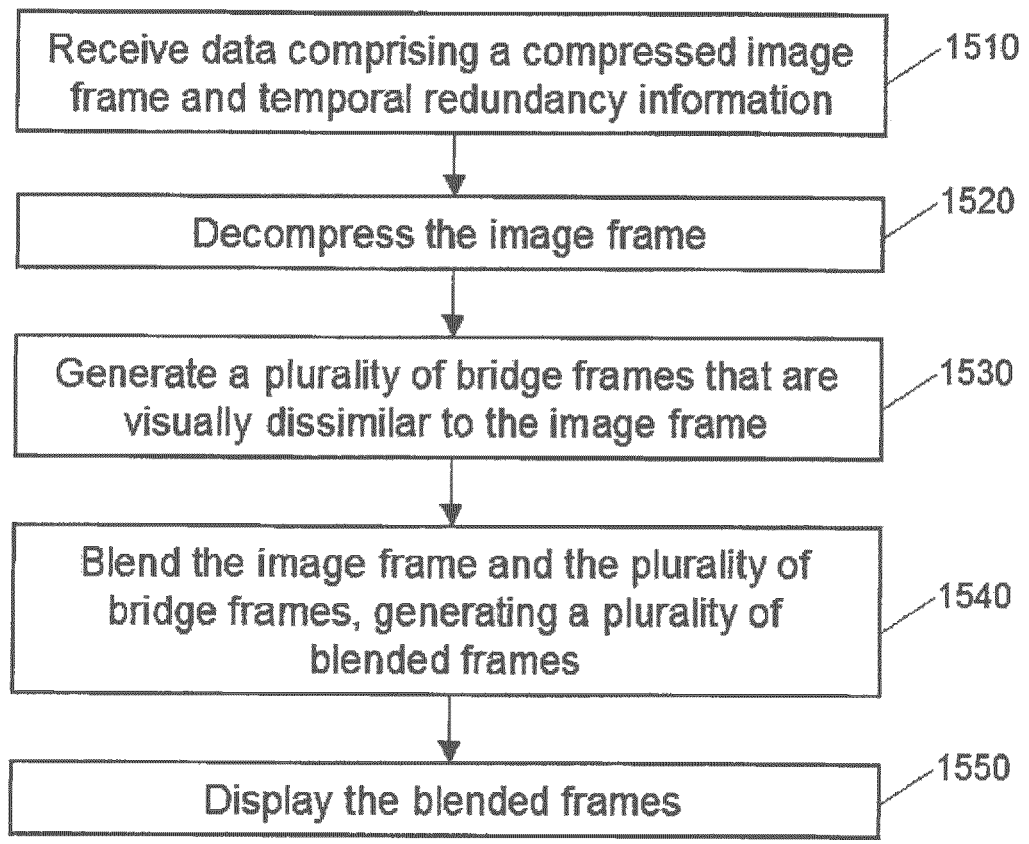
FIG. 15 is a flowchart of a method of decompressing and displaying one or more image frames in accordance with an embodiment.

FIG. 15 is a flowchart of a method of decompressing and displaying one or more image frames in accordance with an embodiment. In an illustrative embodiment, a compressed video file 2500 is stored in storage 1440. Compressed video file 2500 may be generated by video display manager 1400 or, alternatively, received from another device or via a network such as the Internet.

At step 1510, data comprising a compressed image frame and temporal redundancy information is received. In the illustrative embodiment, processor 1410 retrieves compressed video file 2500 from storage 1440.

Figure 16:
FIG. 16 shows an image frame in accordance with an embodiment.

At step 1520, the image frame is decompressed. Decompression module 1420 decompresses compressed video file 2500, generating a video image frame. FIG. 16 shows an image frame 1650 showing a man against a background of clouds and sky.

Figure 17A:
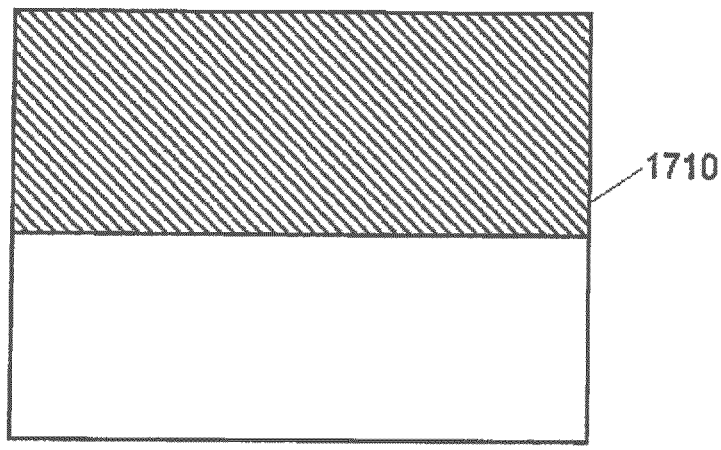
FIGS. 17A-17B show respective bridge frames in accordance with an embodiment.
Figure 17B:
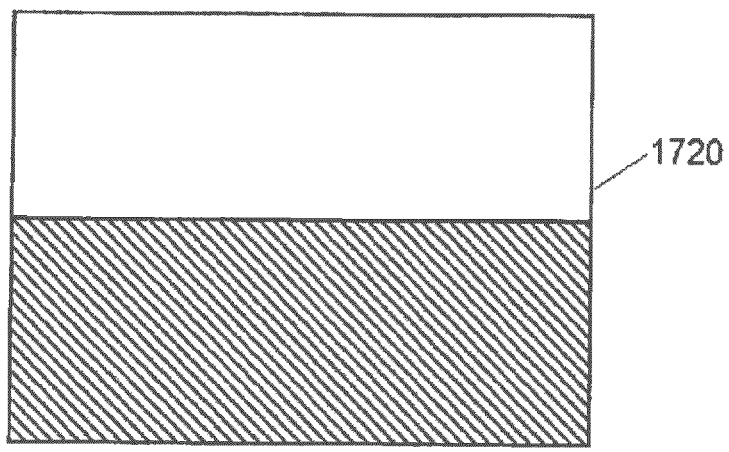

At step 1530, a plurality of bridge frames that are visually dissimilar to the image frame are generated. Bridge frame generator 1430 generates two or more bridge frames that are dissimilar from image frame 1650. FIGS. 17A and 17B show two bridge frames 1710 and 1720 that may be generated. In the illustrative embodiment, bridge frame 1710 has a first pattern and a bridge frame 1720 has a second pattern that is complementary to the first pattern of bridge frame 1710.

In other embodiments, bridge frames may be retrieved from a storage.

Figure 18A:
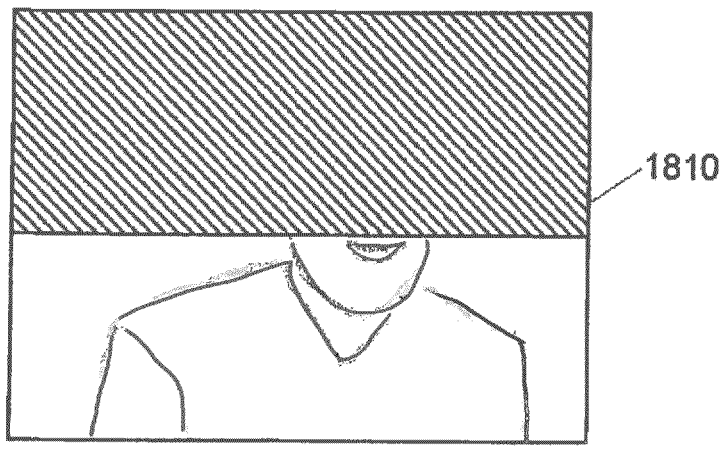
FIGS. 18A-18B show respective blended frames in accordance with an embodiment.
Figure 18B:

At step 1540, the image frame and the plurality of bridge frames are blended, generating a plurality of blended frames. In the illustrative embodiment, frame display module 1450 blends image frame 1650 and bridge frame 1710 to generate blended frame 1810, shown in FIG. 18A. Frame display module 1450 also blends image frame 1650 and bridge frame 1720 to generate blended frame 1820, shown in FIG. 18B.

Figure 18C:
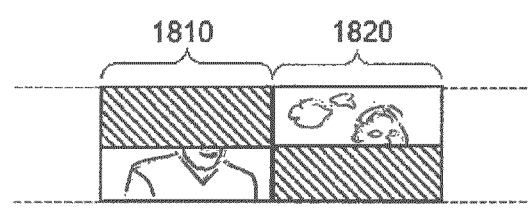
FIG. 18C shows a pattern comprising a plurality of blended frames in accordance with an embodiment.

At step 1550, the plurality of blended frames are displayed. Frame display module 1450 now displays blended frames 1810 and 1820 in a manner similar to that described above. For example, blended frames 1810 and 1820 may be displayed in accordance with a predetermined pattern, for example. In an embodiment illustrated in FIG. 18C, blended frames 1810, 1820 consecutively in a predetermined pattern.

In other embodiments, blended frames 1810 may be displayed in a pattern that includes a plurality of blended frames and image frame 1650, or in a pattern that includes other bridge frames.

Figure 18D:
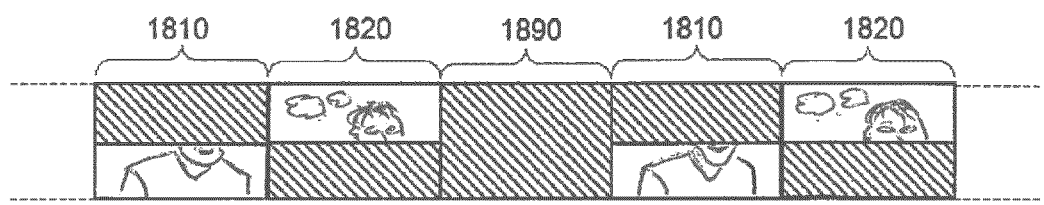
FIG. 18D shows a predetermined pattern that includes repetition of a second pattern that comprises a plurality of blended frames in accordance with an embodiment.

In accordance with another embodiment, a plurality of blended frames may be displayed in accordance with a predetermined pattern that includes a first pattern comprising the plurality of blended frames, and a second pattern that includes repetition of the first pattern. In an embodiment illustrated in FIG. 18D, blended frames 1810 and 1820 are displayed in a repeating pattern that includes blended frame 1810, blended frame 1820, and a bridge frame 1890.

In various embodiments, the method steps described herein, including the method steps described in FIG. 15, may be performed in an order different from the particular order described or shown. In other embodiments, other steps may be provided, or steps may be eliminated, from the described methods.

Systems, apparatus, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Systems, apparatus, and methods described herein may be implemented using computers operating in a client-server relationship. Typically, in such a system, the client computers are located remotely from the server computer and interact via a network. The client-server relationship may be defined and controlled by computer programs running on the respective client and server computers.

Systems, apparatus, and methods described herein may be used within a network-based cloud computing system. In such a network-based cloud computing system, a server or another processor that is connected to a network communicates with one or more client computers via a network. A client computer may communicate with the server via a network browser application residing and operating on the client computer, for example. A client computer may store data on the server and access the data via the network. A client computer may transmit requests for data, or requests for online services, to the server via the network. The lay perform requested services and provide data to the client computer(s). The server may also transmit data adapted to cause a client computer to perform a specified function, e.g., to perform a calculation, to display specified data on a screen, etc.

Systems, apparatus, and methods described herein may be implemented using a computer program product tangibly embodied in an information carrier, e.g., in a non transitory machine-readable storage device, for execution by a programmable processor; and the method steps described, herein, including one or more of the steps of FIG. 15, may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Figure 19:
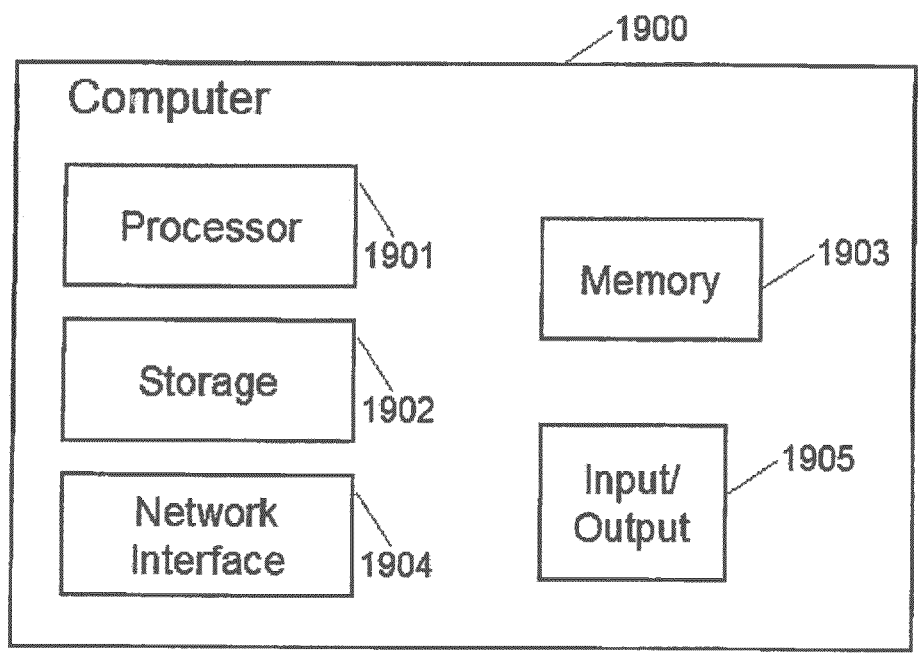
FIG. 19 is a high-level block diagram of an exemplary computer that may be used to implement certain embodiments.

A high-level block diagram of an exemplary computer that may be used to implement systems, apparatus and methods described herein is illustrated in FIG. 19. Computer 1900 includes a processor 1901 operatively coupled to a data storage device 1902 and a memory 1903. Processor 1901 controls the overall operation of computer 1900 by executing computer program instructions that define such operations. The computer program instructions may be stored in data storage device 1902, or other computer readable medium, and loaded into memory 1903 when execution of the computer program instructions is desired. Thus, the method steps of FIG. 15 can be defined by the computer program instructions stored in memory 1903 and/or data storage device 1902 and controlled by the processor 1901 executing the computer program instructions. For example, the computer program instructions can be implemented as computer executable code programmed by one skilled in the art to perform an algorithm defined by the method steps of FIG. 15. Accordingly, by executing the computer program instructions, the processor 1901 executes an algorithm defined by the method steps of FIG. 15. Computer 1900 also includes one or more network interfaces 1904 for communicating with other devices via a network. Computer 1900 also includes one or more input/output devices 1905 that enable user interaction with computer 1900 (e.g., display, keyboard, mouse, speakers, buttons, etc.).

Processor 1901 may include both general and special purpose microprocessors, and may be the sole processor or one of multiple processors of computer 1900. Processor 1901 may include one or more central processing units (CPUs), for example. Processor 1901, data storage device 1902, and/or memory 1903 may include, be supplemented by, or incorporated in, one or more application-specific integrated circuits (ASICs) and/or one or more field programmable gate arrays (FPGAs).

Data storage device 1902 and memory 1903 each include a tangible non-transitory computer readable storage medium. Data storage device 1902, and memory 1903, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk, storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 1905 may include peripherals, such as a printer, scanner, display screen, etc. For example, input/output devices 1905 may include a display device such as a cathode ray tube (CRT) or liquid crystal display (LCD) monitor for displaying information to the user, a keyboard, and a pointing device such as a mouse or a trackball by which the user can provide input to computer 1900.

Any or all of the systems and apparatus discussed herein, including video display manager 1400, and components thereof, may be implemented using a computer such as computer 1900.

One skilled in the art will recognize that an implementation of an actual computer or computer system may have other structures and may contain other components as well, and that FIG. 19 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method of displaying one or more frames of a video, the method comprising:
   receiving data comprising a compressed image frame and temporal redundancy information;
   decompressing the image frame;
   generating a plurality of bridge frames that are visually dissimilar to the image frame, wherein the plurality of bridge frames includes:
      a first bridge frame having a first width, the first bridge frame comprising a first white rectangle in an upper portion of the first bridge frame, the first white rectangle having the first width, and a first dark rectangle in a lower portion of the first bridge frame, the first dark rectangle having the first width; and
      a second bridge frame having a second width, the second bridge frame comprising a second white rectangle in a lower portion of the second bridge frame, the second white rectangle having the second width, and a second dark rectangle in an upper portion of the second bridge frame, the second dark rectangle having the second width;
   blending the image frame and the plurality of bridge frames, generating a plurality of blended frames, wherein the plurality of blended frames include:
      a first blended frame that includes the first dark rectangle in a lower portion of the first blended frame and a first portion of the image frame in an upper portion of the first blended frame; and
      a second blended frame that includes the second dark rectangle in an upper portion of the second blended frame and a second portion of the image frame different from the first portion in a lower portion of the second blended frame; and
   displaying the plurality of blended frames consecutively within a video.

2. The method of claim 1, further comprising:
   decompressing the image frame based on the temporal redundancy information.

3. The method of claim 1, wherein the data comprises a compressed video file associated with a compression format that uses temporal redundancy to achieve compression of video data.

4. The method of claim 1, wherein each bridge frame comprises a timed unlit-screen pause.

5. The method of claim 1, further comprising:
   displaying the plurality of blended frames in accordance with a predetermined pattern.

6. The method of claim 1, further comprising:
   displaying the blended frames in accordance with a predetermined pattern that includes a first pattern comprising the plurality of blended frames, and a second pattern that comprises repetition of the first pattern.

7. The method of claim 1, wherein the plurality of bridge frames comprise a first bridge frame having a first pattern and a second bridge frame having a second pattern that is complementary to the first pattern.

8. An apparatus comprising:
   a storage configured to:
      store a compressed image frame and temporal redundancy information; and
   a processor configured to:
      receive the compressed image frame and the temporal redundancy information;

decompress the image frame;
generate a plurality of bridge frames that are visually dissimilar to the image frame, wherein the plurality of bridge frames includes:
a first bridge frame having a first width, the first bridge frame comprising a first white rectangle in an upper portion of the first bridge frame, the first white rectangle having the first width, and a first dark rectangle in a lower portion of the first bridge frame, the first dark rectangle having the first width; and
a second bridge frame having a second width, the second bridge frame comprising a second white rectangle in a lower portion of the second bridge frame, the second white rectangle having the second width, and a second dark rectangle in an upper portion of the second bridge frame, the second dark rectangle having the second width;
blend the image frame and the plurality of bridge frames, generating a plurality of blended frames, wherein the plurality of blended frames include:
a first blended frame that includes the first dark rectangle in a lower portion of the first blended frame and a first portion of the image frame in an upper portion of the first blended frame; and
a second blended frame that includes the second dark rectangle in an upper portion of the second blended frame and a second portion of the image frame different from the first portion in a lower portion of the second blended frame; and
display the plurality of blended frames consecutively within a video.

9. The apparatus of claim 8, wherein the processor is further configured to:
decompress the image frame based on the temporal redundancy information.

10. The apparatus of claim 8, wherein the data comprises a compressed video file associated with a compression format that uses temporal redundancy to achieve compression of video data.

11. The apparatus of claim 8, wherein each bridge frame comprises a timed unlit-screen pause.

12. The apparatus of claim 8, wherein the processor is further configured to:
display the plurality of blended frames in accordance with a predetermined pattern.

13. The apparatus of claim 8, wherein the processor is further configured to:
display the blended frames in accordance with a predetermined pattern that includes a first pattern comprising the plurality of blended frames, and a second pattern that comprises repetition of the first pattern.

14. The apparatus of claim 8, wherein the plurality of bridge frames comprise a first bridge frame having a first pattern and a second bridge frame having a second pattern that is complementary to the first pattern.

15. The method of claim 1, wherein the image frame is associated with a first video, the method further comprising:
displaying the plurality of blended frames derived from the image frame in a second video.

* * * * *